(No Model.)  7 Sheets—Sheet 1.

C. FERRAND.
STEAM GENERATOR.

No. 596,865.  Patented Jan. 4, 1898.

Witnesses

Inventor
Charles Ferrand
By James L. Norris
Atty.

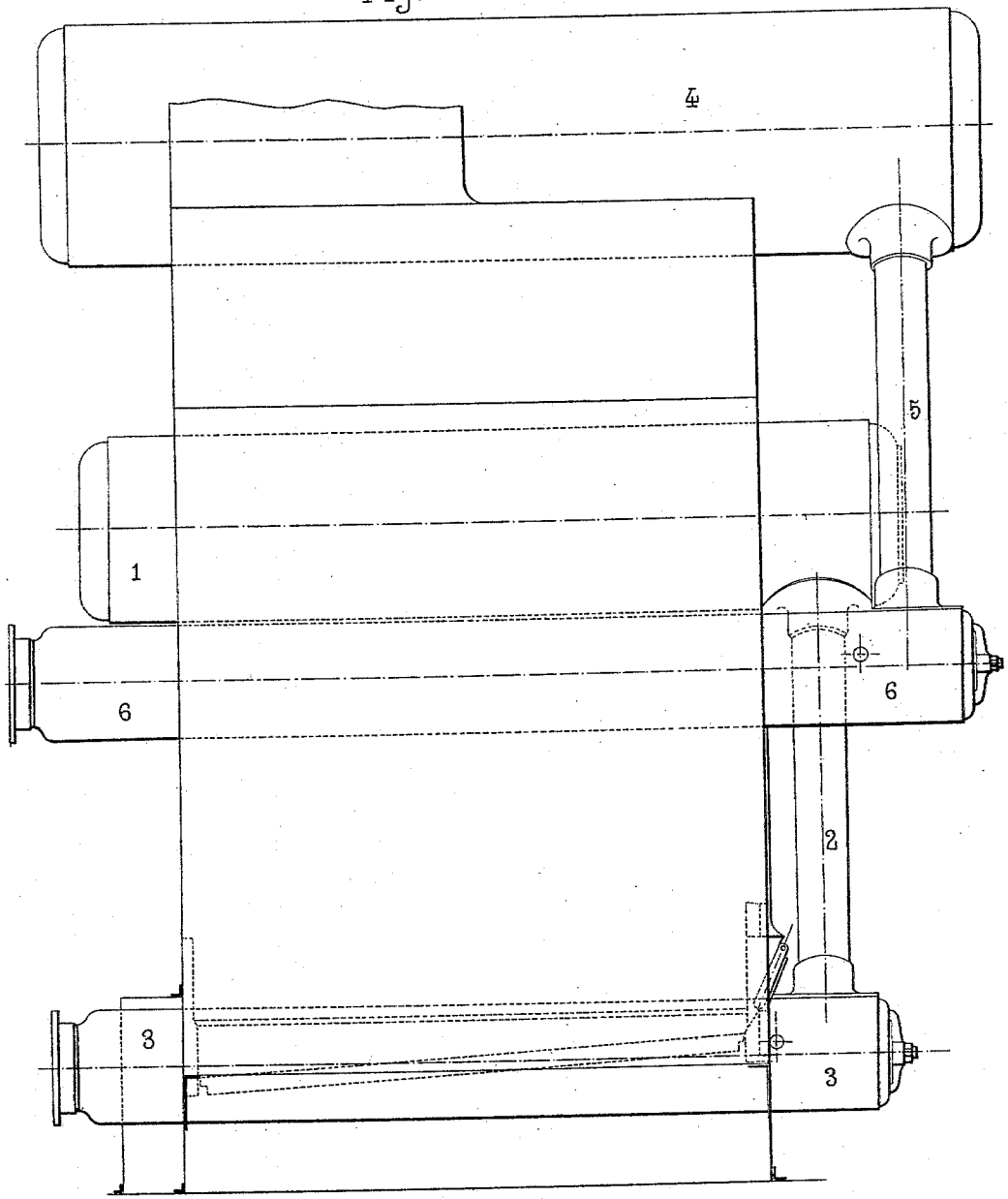

(No Model.)  7 Sheets—Sheet 3.

C. FERRAND.
STEAM GENERATOR.

No. 596,865. Patented Jan. 4, 1898.

Witnesses

Inventor
Charles Ferrand
By James L. Norris
Atty (No Model.) 7 Sheets—Sheet 4.

C. FERRAND.
STEAM GENERATOR.

No. 596,865. Patented Jan. 4, 1898.

Witnesses

Inventor
Charles Ferrand
By James L. Norris
Atty

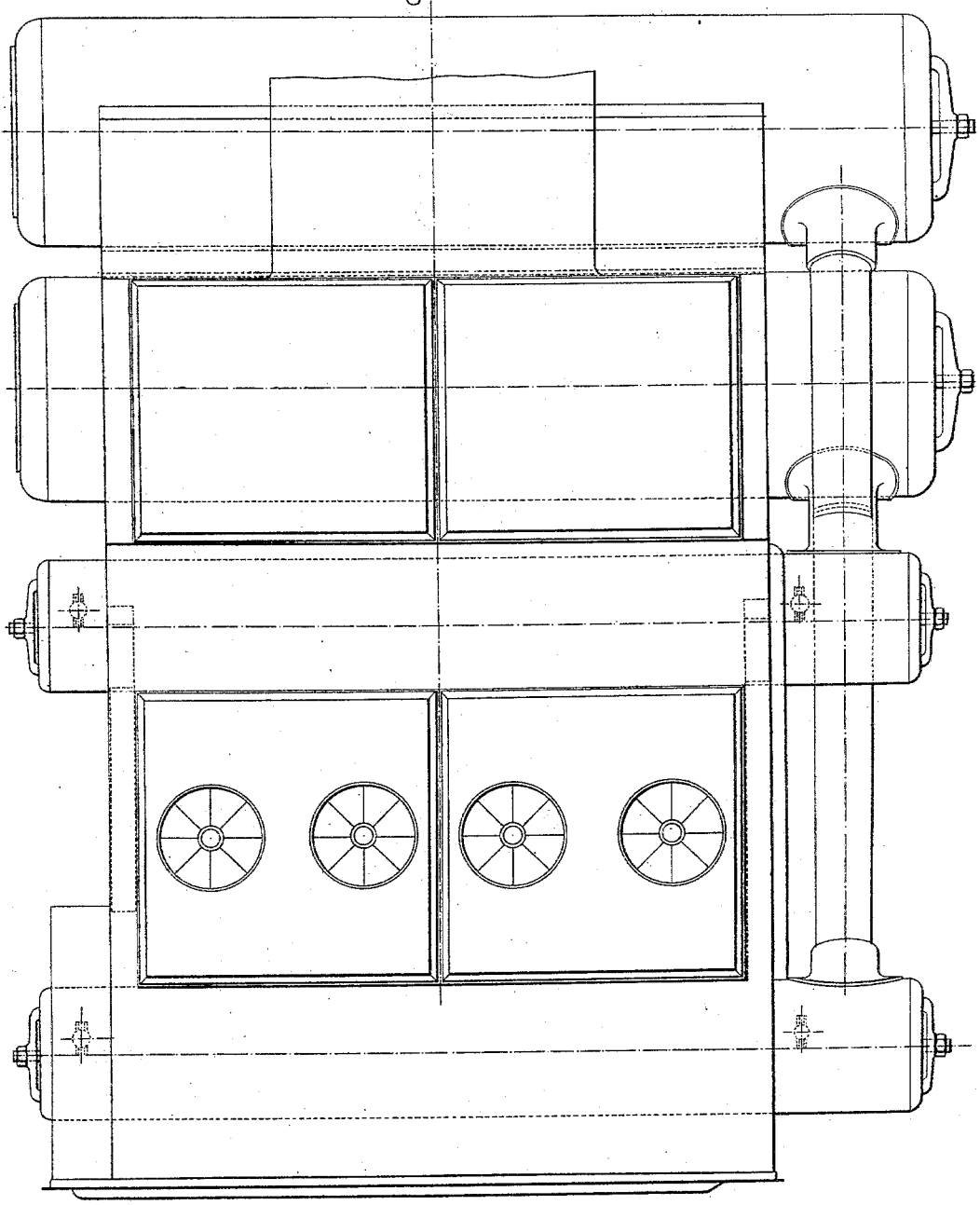

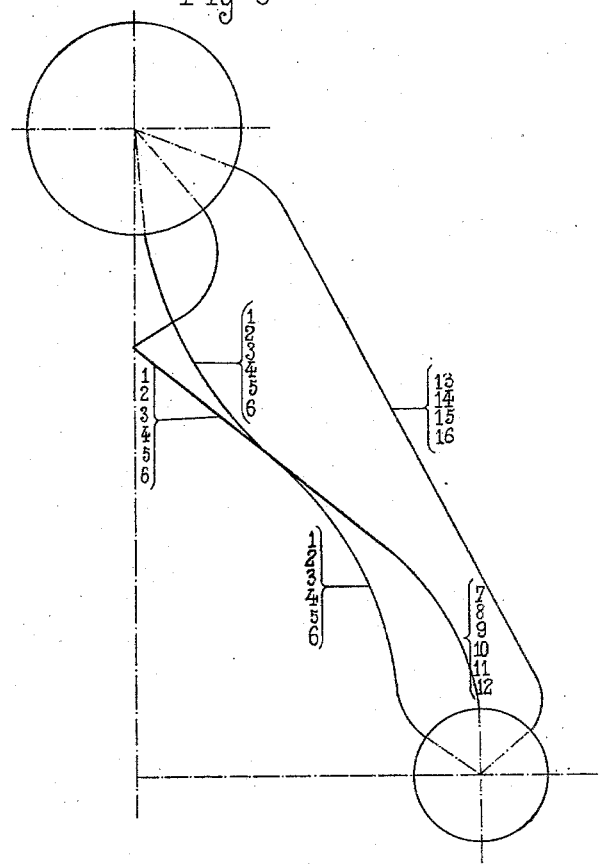

(No Model.) 7 Sheets—Sheet 7.
C. FERRAND.
STEAM GENERATOR.
No. 596,865. Patented Jan. 4, 1898.
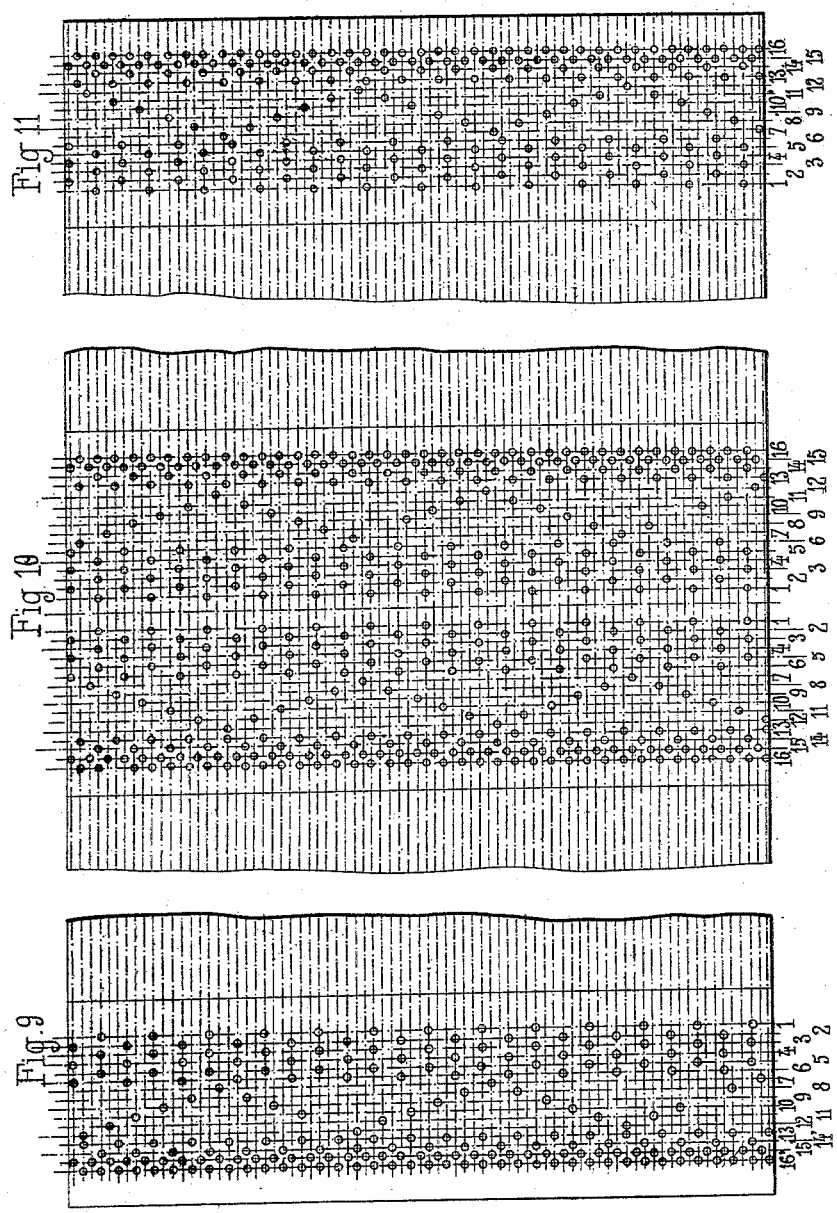
Witnesses
Inventor
Charles Ferrand
By James L. Norris
Atty

UNITED STATES PATENT OFFICE.

CHARLES FERRAND, OF PARIS, FRANCE.

STEAM-GENERATOR.

SPECIFICATION forming part of Letters Patent No. 596,865, dated January 4, 1898.

Application filed July 17, 1897. Serial No. 644,922. (No model.)

*To all whom it may concern:*

Be it known that I, CHARLES FERRAND, a citizen of France, residing at Paris, in the Department of the Seine, France, have invented certain new and useful Improvements in Steam-Generators, of which the following is a specification.

Multitubular steam-generators of the "Du Temple" type as at present used in torpedo-boats are not economical when used in large vessels, owing to their triangular shape, and especially as, owing to their limited height, they require large floor-space and do not utilize the vertical space. They are economical only when worked at a rate not exceeding two hundred kilograms per square meter of grate-surface, and this of course necessitates inconveniently large grates.

This invention has for its object to provide a multitubular boiler the shape of which is essentially that of a parallelepipedon and is highly suitable for use in large vessels and for the utilization of extensive and effectual heating-chambers, and, moreover, effects great economy when worked with forced draft. It consists of two multitubular boilers, one over the other. These two boilers are independent of each other as regards feed and emission of steam. They have one grate in common. By means of fire-screens formed by the tubes themselves the flames and hot products from the fire are so directed as to pass directly to the chimney or to first return toward the front side, as required.

In order that my invention may be well understood, I will describe the same with reference to the accompanying drawings, in which an arrangement is illustrated wherein the flames and hot products from the fire return toward the front side.

Figure 1:
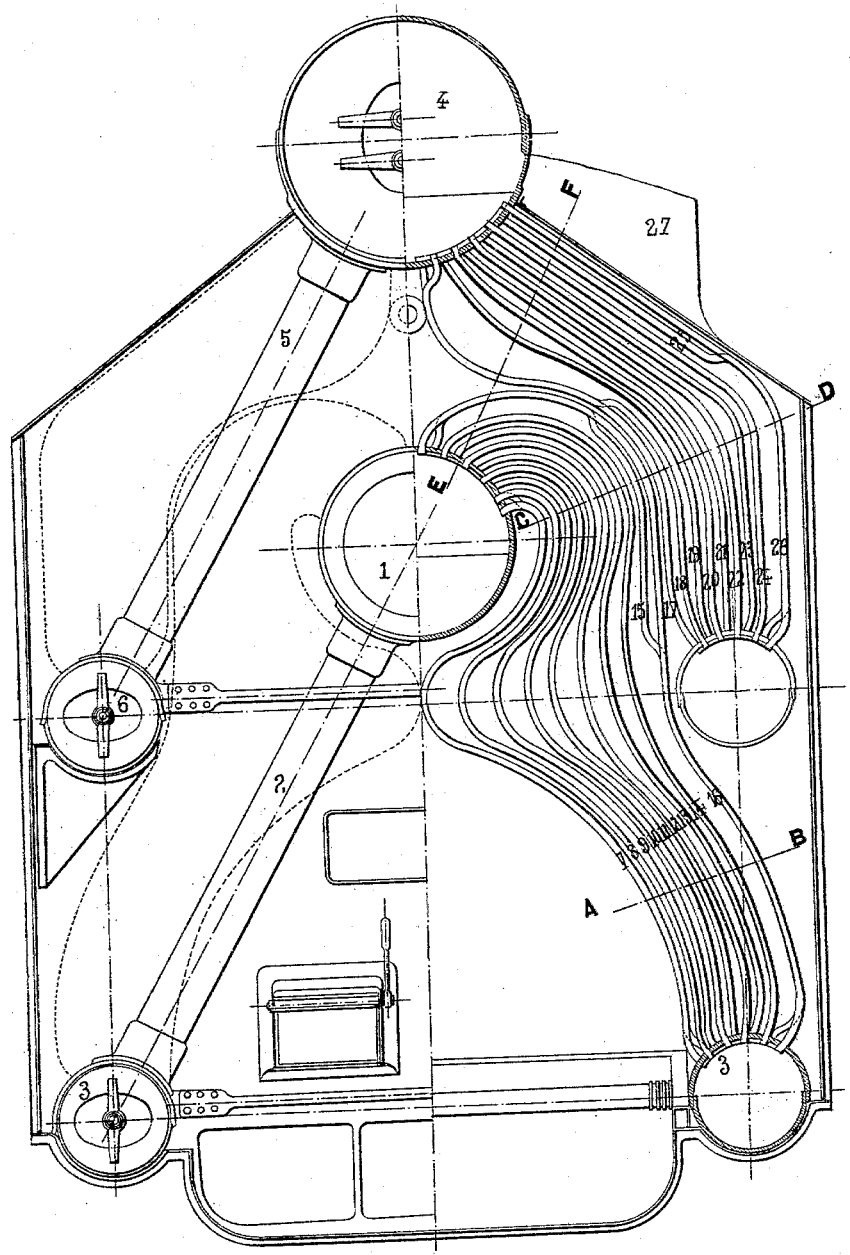
Figure 5:
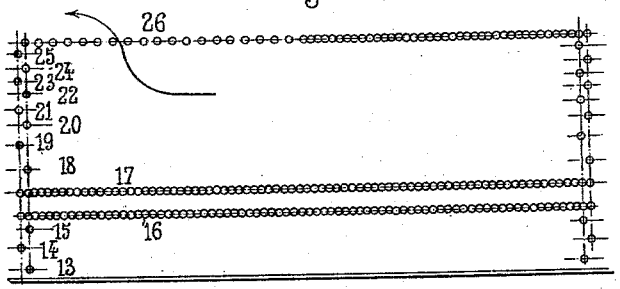
Figure 4:
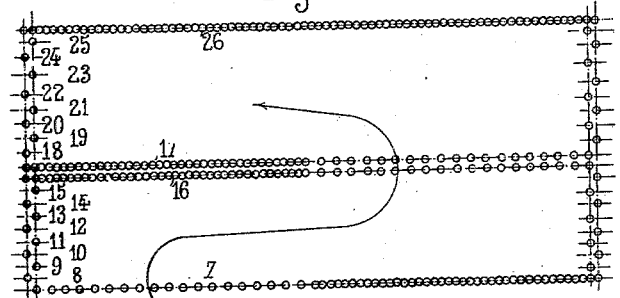
Figure 3:
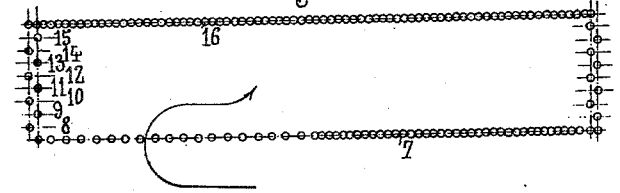
Figure 6:
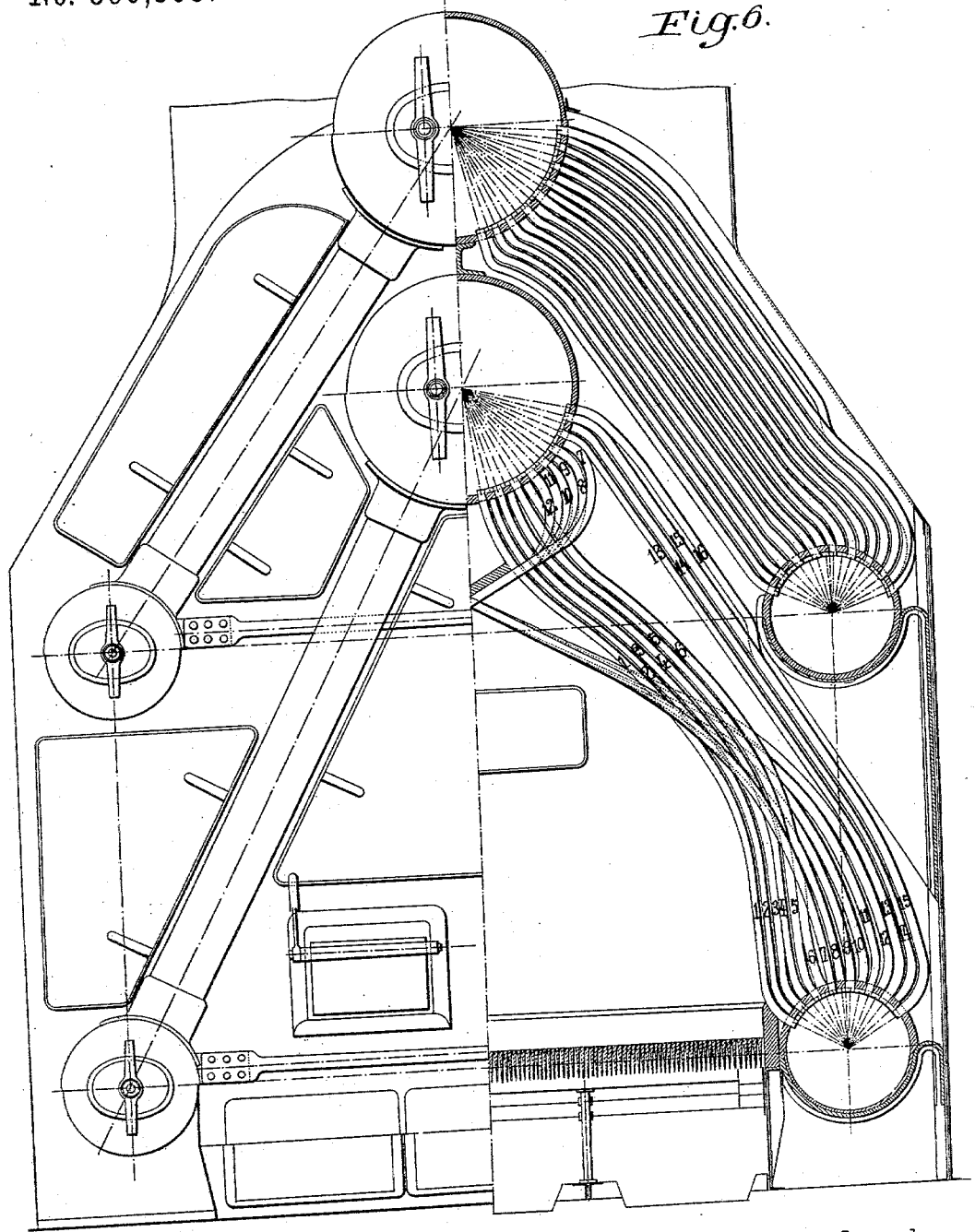

Figure 1 represents a steam-generator, half in front elevation and the other half in vertical section, the latter showing the arrangement of the tubular system. Fig. 2 represents the generator in side elevation. Figs. 3, 4, and 5 are respectively sections taken on the lines A B, C D, and E F, respectively, of Fig. 1, to illustrate the tubular system. Fig. 6 is a half-elevation and half vertical section showing a modification of the generator represented in Fig. 1. Fig. 7 is a side elevation of the generator thus modified. Fig. 8 is a diagrammatical view of this modification. Figs. 9, 10, and 11 illustrate the distribution of the tubes and their combination with the three collectors of the lower portion or boiler, Fig. 9 representing the surfacial development of the lower left-hand collector, Fig. 10 the surfacial development of the upper collector, and Fig. 11 that of the lower right-hand collector.

1 and 4 in Fig. 1 show the upper collectors of the two boilers, 3 and 6 the lower collectors, and 2 and 5 the respective water-return pipes or passages.

The heating-surface is formed by the boiler-tubes which connect the upper collectors with the lower collectors. These tubes are arranged as cylinders 7 8 9 10 11 12 13 14 15 16 for the lower boiler and 17 18 19 20 21 22 23 24 25 26 for the upper boiler.

In the forward portion of the boiler the cylinder of tubes 7 is formed by tubes placed into contact, Fig. 3, whereby a fire-screen is formed which compels the flames to pass from the front toward the back. On the second portion of the cylinder the tubes are spaced, Fig. 3, and the flames return to the front by passing across the tubes. For this purpose the cylinder of tubes 16 forms a perfect screen at the rear, whereas at the front and only at that portion which communicates with the tubes of the second boiler the said tubes are spaced, Fig. 4. The same is the case with those of the cylinder 17 of the second boiler. The flames in this case pass between the tubes of the second boiler by traveling toward the rear. The tubes of the cylinder 26, which form a screen at the base, are separated at the rear above, Fig. 5, whereby the flames are enabled to travel toward the chimney 27, Fig. 1.

All the tubes of the several cylinders comprised between 7 and 16 and 17 and 26 are arranged in any suitable manner so as to best divide the flames and hot gases. With these arrangements it may be calculated that when the lower boiler is being worked at high pressure (three hundred kilograms of fuel per square meter of grate) the upper boiler will be heated by the partly-cooled gases under the same conditions as if the same were heated by a grate burning one hundred kilograms per square meter. In the same manner if five hundred kilograms of fuel per square meter of grate be burned the second boiler will have to utilize a quantity of heat which may be compared with that produced by the combustion of from two hundred to three hundred kilograms per square meter of grate-surface. From this it results that if the lower boiler be worked at a low economical pressure the whole heating apparatus will nevertheless work economically, since the saving will be realized by the upper boiler worked at a reduced pressure.

It is evident that this improved apparatus realizes in boilers what the double and triple expansion does with regard to engines or to heaters, since the upper boiler absorbs the whole heat, which would be lost if the lower boiler were heated excessively as a single boiler.

In constructing the lower boiler the tubes are made to terminate in the steam-space, whereby the circulation is more reliable, especially when worked at high pressure. In the upper boiler, on the contrary, which is never worked excessively, the tubes terminate at the lower part. For the tubes of the lower boiler the arrangement represented in Fig. 6 may be adopted.

The distribution of tubes generally employed in multitubular boilers fitted with small tubes of all types presents from the point of view of an efficient utilization of heat the following serious defects: The hot gases on leaving the furnace are cooled by meeting the closely-arranged sets of tubes. They burn defectively, as the frequent reignitions occurring in the chimneys clearly prove. The tubes forming the sides of the combustion-chamber are simultaneously heated by direct radiation and by contact. They on their part alone evaporate from fifty to sixty per cent. of the total production of the boiler. There is every reason to suppose that in many cases their maximum evaporating limit has been nearly reached. It therefore is advantageous to so arrange the tubes which are to come in direct contact with the fire as to expose to the intense heat of the fire only as small a portion as possible of their longitudinal extent and to reduce the number of tubes so as to avoid any rapid cooling of the gases when leaving the furnace. The use of two superposed boilers permits of realizing these two desiderata.

Fig. 6 illustrates the arrangements to be applied to the lower body. The system of tubes of this lower boiler is divided into four groups which cross each other, leaving between them secondary combustion-chambers. The first group (tubes 1 and 2) comes into direct contact with the fire only at its base, the second group (tubes 7 8 9 10 11 12) only at its top. The third group, (tubes 3 4 5 6,) owing to the distances maintained between the tubes, is still exposed to the direct radiation from the furnace, and, finally, the fourth group (tubes 13, 14, 15, and 16) occupies a position which may be compared with the systems of tubes used in boilers at the present time. The upper boiler does not present any new arrangement. It should be placed as high as possible above the lower boiler, so as to increase the intermediate combustion-chamber. This height is fixed according to local convenience.

According to circumstances screens formed by the horizontally-placed tubes may be employed for directing the flames and heated products into the upper body. The feeding is effected within the steam-space, and the feed is conveyed by separate apparatus. The steam-outlets are likewise separate and supply either a single collector or, preferably, two different collectors. The main engine may, for example, be supplied from the lower boiler and the secondary apparatus from the upper boiler.

In the case of large vessels the installation of generators according to this invention may be "double ended."

The apparatus is intended for forced draft and for use when employed at a combustion rate of at least three hundred kilograms per square meter of grate.

In cases where—for instance, in a roadstead—only a small quantity of steam, corresponding to the production of the lower boiler, is required the upper boiler will be converted into the economizer by connecting both by suitable piping provided with cocks.

What I claim is—

1. A steam-generator comprising two multitubular boilers each composed of an upper collector and two lower collectors, said collectors being connected by water-tubes forming fire-screens, one of said boilers being arranged above the other and both having a common grate, said boilers having separate and independent water-inlets and steam-outlets, the arrangement being such that the escaping flames and hot products of combustion after first heating the lower boiler operate to heat the upper boiler, substantially as described.

2. A steam-generator composed of two multitubular boilers, the system of tubes of the lower boiler being formed by four groups of tubes, crossing each other and constituting the sides of the combustion-chamber; this arrangement being especially suitable for distributing the heating effect resulting from the direct contact with the fire and less apt to rapidly cool the hot gases from the furnace substantially as herein described.

In testimony whereof I have hereunto set my hand in presence of two subscribing witnesses.

CHARLES FERRAND.

Witnesses:
GEORGES DELOM,
EDWARD P. MACLEAN.